United States Patent
Onai

(10) Patent No.: US 9,334,408 B2
(45) Date of Patent: May 10, 2016

(54) COATING LAYER AND METHOD FOR FORMING COATING LAYER

(75) Inventor: Hiroyuki Onai, Tokyo (JP)

(73) Assignee: THREEBOND FINE CHEMICAL CO., LTD., Sagamihara-shi (JP)

( * ) Notice: Subject to any disclaimer, the term of this patent is extended or adjusted under 35 U.S.C. 154(b) by 359 days.

(21) Appl. No.: 14/112,083

(22) PCT Filed: May 15, 2012

(86) PCT No.: PCT/JP2012/062388
§ 371 (c)(1),
(2), (4) Date: Nov. 15, 2013

(87) PCT Pub. No.: WO2012/157635
PCT Pub. Date: Nov. 22, 2012

(65) Prior Publication Data
US 2014/0065396 A1     Mar. 6, 2014

(30) Foreign Application Priority Data
May 18, 2011 (JP) ................................. 2011-111744

(51) Int. Cl.
| C08G 77/26 | (2006.01) |
| C09D 7/12 | (2006.01) |
| C09D 183/04 | (2006.01) |
| C09D 7/00 | (2006.01) |
| C09G 1/16 | (2006.01) |
| C09D 183/08 | (2006.01) |
| C08G 77/18 | (2006.01) |
| B05D 7/14 | (2006.01) |
| B05D 7/00 | (2006.01) |

(52) U.S. Cl.
CPC .............. *C09D 7/1233* (2013.01); *C09D 7/001* (2013.01); *C09D 183/04* (2013.01); *C09D 183/08* (2013.01); *C09G 1/16* (2013.01); *B05D 7/14* (2013.01); *B05D 7/52* (2013.01); *C08G 77/18* (2013.01); *C08G 77/26* (2013.01); *Y10T 428/24975* (2015.01); *Y10T 428/31663* (2015.04)

(58) Field of Classification Search
CPC ....... C08G 77/18; C08G 77/26; C09D 183/06
See application file for complete search history.

(56) References Cited

FOREIGN PATENT DOCUMENTS

| JP | 64-075576 A | 3/1989 |
| JP | 07-305053 A | 11/1995 |
| JP | 11-80668 A | 3/1999 |
| JP | 2001-011435 A | 1/2001 |
| JP | 2002-356651 A | 12/2002 |
| JP | 2004-339305 A | 12/2004 |
| JP | 2005-028337 A | 2/2005 |
| JP | 2005-029695 A | 2/2005 |
| JP | 2006-077071 A | 3/2006 |
| JP | 2006-247544 A | 9/2006 |
| JP | 2008-075021 A | 4/2008 |
| JP | 2009-040936 A | 2/2009 |
| JP | 2009-138063 A | 6/2009 |

OTHER PUBLICATIONS

JP 2009 138063 maching translation (2009).*
International Search Report dated Aug. 14, 2012, issued in corresponding application No. PCT/JP2012/062388.

* cited by examiner

*Primary Examiner* — Kuo-Liang Peng
(74) *Attorney, Agent, or Firm* — Westerman, Hattori, Daniels & Adrian, LLP

(57) ABSTRACT

The coating layer has excellent water repellency and satisfactory gloss to a base material and provides a method for forming a coating layer in which the agents used have, for example, excellent storage stability and dispersibility. The coating layer has a layer (I) formed by curing a film-forming agent containing predetermined amounts of a polyorganosiloxane having at least one hydrolyzable functional group in its molecule, a curing catalyst, and an organic solvent including a saturated hydrocarbon solvent and an aromatic hydrocarbon solvent each having 8 to 15 carbon atoms at a predetermined ratio and a layer (II) formed by solidifying a finish treatment agent containing predetermined amounts of a polyorganosiloxane having at least one pendant amino group, a polyorganosiloxane having two or more terminal amino groups, a silicone resin emulsion emulsified with a nonionic or anionic surfactant, a hydrophilic group-containing organic solvent, and water.

14 Claims, No Drawings

COATING LAYER AND METHOD FOR FORMING COATING LAYER

TECHNICAL FIELD

The present invention relates to a coating layer and a method for forming a coating layer. More specifically, the invention relates to a coating layer to be applied to a base material, for example, the exterior of a vehicle, and relates to a method for forming the coating layer.

BACKGROUND ART

Coating treatments with various treating agents have conventionally been performed for imparting water repellency, gloss, and luster to the exteriors of vehicles that are used outdoors, such as automobiles and industrial vehicles, for example, painted surfaces of automobiles. For example, known are a coating process of a water repellent agent for the exterior of a vehicle through application of an amino-modified silicone oil emulsion and then over-coating of another emulsion (Patent Literature 1), a process of lustering a painted surface of a vehicle through application and drying of a coating agent mainly composed of an amino-modified silicone oil and then over-coating and drying of a lustering agent for a painted surface of a vehicle composed of an aqueous emulsion containing a dimethyl silicone oil and an amino-modified silicone oil (Patent Literature 2), and a process of forming a water-slippable film of silicone on a surface of a base material through application of an amino-modified silicone oil emulsion onto the surface of the base material and then over-coating of an anionic silica microparticle dispersion there onto (Patent Literature 3). In each of these processes, an agent mainly composed of an amino-modified silicone oil is applied onto a base material such as a painted surface of a vehicle, and then another agent is over-coated. These agents have insufficient storage stability and also problematic workability during application.

Furthermore, various coating compositions for providing water repellency and gloss to painted surfaces of vehicles are known. For example, Patent Literature 4 describes a lustering and water repellent composition containing dimethyl polysiloxane, amino-modified dimethyl polysiloxane, an acid in an amount necessary for neut ralizing the amino-modified dimethyl polysiloxane, an alcohol, and water. Patent Literature 5 describes a vehicle-coating agent containing a moisture-curing silicone oligomer, a curing catalyst, and a telechelic silicone oil at predetermined amounts. Examples of the reactive functional group contained in the telechelic silicone oil include a hydroxyl group, carbinol groups (—$R^5$OH, wherein $R^5$ represents an alkylene group), aminoalkyl groups (—$R^6NH_2$, wherein $R^6$ represents an alkylene group), and carboxyalkyl groups (—$R^7$COOH, wherein $R^7$ represents an alkylene group). Patent Literature 6 describes a silicone composition for water repellent coating composed of a polydimethylsiloxane having trifunctional hydrolyzable groups at both ends, a partial hydrolysis condensate of alkoxysilane having 1 to 4 hydrolyzable groups, an organic titanium catalyst, an aliphatic hydrocarbon or ester solvent, and an alcohol solvent. Patent Literature 7 describes an emulsified lustering agent, which is an emulsion of predetermined amounts of an amino-modified silicone oil having a specific viscosity at 25° C. and a dimethyl silicone oil dispersed in water and having an average oil droplet diameter adjusted to a predetermined level. Patent Literature 8 describes a water repellent composition composed of a telechelic polyorganosiloxane, a metal alkoxide curing catalyst, and an alcohol-based solvent. Patent Literature 9 describes a surface-protective water repellent agent containing a moisture-curing liquid silicone oligomer, a curing catalyst, a modified linear polydimethylsiloxane containing silanol groups at both ends, and a specific volatile solvent at predetermined amounts. Patent Literature 10 describes a water repellency treating agent composed of silicone including amino-modified silicone, a water-soluble organic solvent such as alcohol, and a silicone emulsion emulsified with a surfactant. The water repellency treating agent eliminates the need of surface treatment and other steps that have been conventionally performed and shows satisfactory water repellency even in direct application of the agent alone onto a base material. These agents are each a one-component water repellency treating agent. Agents containing surfactants or acids, however, exhibit insufficient adhesiveness to coating films, water repellency, and gloss.

CITATION LIST

Patent Literatures

Patent Literature 1:
  Japanese Unexamined Patent Application Publication No. 2005-28337
Patent Literature 2:
  Japanese Unexamined Patent Application Publication No. 2005-29695
Patent Literature 3:
  Japanese Unexamined Patent Application Publication No. 2006-247544
Patent Literature 4:
  Japanese Unexamined Patent Application Publication No. Hei11-80668
Patent Literature 5:
  Japanese Unexamined Patent Application Publication No. 2008-75021
Patent Literature 6:
  Japanese Unexamined Patent Application Publication No. 2002-356651
Patent Literature 7:
  Japanese Unexamined Patent Application Publication No. Sho64-75576
Patent Literature 8:
  Japanese Unexamined Patent Application Publication No. Hei1-305053
Patent Literature 9:
  Japanese Unexamined Patent Application Publication No. 2009-138063
Patent Literature 10:
  Japanese Unexamined Patent Application Publication No. 2001-11435

SUMMARY OF INVENTION

Technical Problem

The present invention provides a coating layer that can impart excellent water repellency and satisfactory gloss to a base material, for example, the exterior of a vehicle and also provides a method for forming a coating layer that can impart excellent water repellency and satisfactory gloss to a base material, for example, the exterior of a vehicle, wherein the agent used has excellent storage stability and dispersibility and excellent workability during application.

Solution to Problem

In order to solve the above problems, the present inventor investigated what problems are present in various conventional coating agents and methods of applying the coating agents. As a result, the inventor has identified the problems of conventional two-component methods that involve applying an agent mainly composed of an amino-modified silicone oil to a base material, for example, a painted surface of a vehicle and then over-coating another agent thereto as described above, the agents each have insufficient storage stability and also problematic workability during application of each agent. The inventor has also identified the problems of one-component water repellency treating agents described above, that is, the agents cannot sufficiently enhance the water repellency and the gloss. In order to solve these problems, the present inventor has further continued the investigation and has found that in one-component water repellency treating agents, i.e., in a treatment without over-coating, an uneven portion generated on the surface or other portions cannot be removed even if the treatment is performed as carefully and warily as possible, and thereby the improvements in water repellency and gloss have limitations. Meanwhile, in the case of employing a method of over-coating an agent onto a coat of a different agent, the inventor has found that it is important that each agent has excellent storage stability and dispersibility, is odorless, and has excellent workability so as to be easily wiped out, for example. Furthermore, the second layer is required to sufficiently complement the uneven portion generated in the first layer and to improve the water repellency and the gloss of the first layer. The inventor has further continued investigation from the above-mentioned viewpoints, in particular, from the viewpoint of combination of layers that can form a coating layer having satisfactory water repellency and gloss and has found that a coating layer consisting of two layers formed of a combination of the following specific agents has excellent water repellency and satisfactory gloss due to interaction between the two layers and that in the following specific method for forming a coating layer using these agents, the agents to be applied have excellent storage stability and dispersibility, do not cause any odors, and are excellent in workability during application. Thus, the present invention has been accomplished.

Accordingly, the present invention relates to:

(1) A coating layer comprising:
   a layer (I) prepared by curing 100 parts by mass in total of a film-forming agent (A) containing:
      3 to 45 parts by mass of a polyorganosiloxane (a-1) having at least one hydrolyzable functional group in its molecule;
      0.05 to 5 parts by mass of a curing catalyst (a-2); and
      50 to 96.95 parts by mass of an organic solvent (a-3) comprising a saturated hydrocarbon solvent having 8 to 15 carbon atoms and an aromatic hydrocarbon solvent having 8 to 15 carbon atoms at a mass ratio of the saturated hydrocarbon solvent to the aromatic hydrocarbon solvent of 100/0 to 50/50, and
   a layer (II) prepared by solidifying 100 parts by mass in total of a finish treatment agent (B) containing:
      0.05 to 15 parts by mass of a polyorganosiloxane (b-1) having at least one pendant amino group (provided that the polyorganosiloxane (b-1) has one or less terminal amino group if the polyorganosiloxane (b-2) has a pendant amino group);
      0.01 to 10 parts by mass of a polyorganosiloxane (b-2) having two or more terminal amino groups;
      1 to 20 parts by mass, in terms of the solid content, of a silicone resin emulsion (b-3) emulsified with a nonionic or anionic surfactant;
      0.1 to 25 parts by mass of a hydrophilic group-containing organic solvent (b-4); and
      30 to 98.84 parts by mass of water (b-5), wherein the layer (I) is disposed on a base material side, and the layer (II) is disposed on a surface side.

Preferred embodiments include:

(2) The coating layer according to embodiment (1), wherein the layer (I) is disposed on a base material, and the layer (II) is disposed on the layer (I);

(3) The coating layer according to embodiment (1) or (2), wherein the layer (I) has a thickness of 0.1 to 0.5 μm, and the layer (II) has a thickness of 0.1 to 0.5 μm;

(4) The coating layer according to any one of embodiments (1) to (3), wherein the amount of the component (a-1) is 5 to 45 parts by mass based on 100 parts by mass of the film-forming agent (A);

(5) The coating layer according to any one of embodiments (1) to (3), wherein the amount of the component (a-1) is 7 to 45 parts by mass based on 100 parts by mass of the film-forming agent (A);

(6) The coating layer according to any one of embodiments (1) to (3), wherein the amount of the component (a-1) is 7 to 30 parts by mass based on 100 parts by mass of the film-forming agent (A);

(7) The coating layer according to any one of embodiments (1) to (6), wherein the amount of the component (b-1) is 0.1 to 5 parts by mass based on 100 parts by mass of the finish treatment agent (B);

(8) The coating layer according to any one of embodiments (1) to (7), wherein the amount of the component (b-2) is 0.1 to 3 parts by mass based on 100 parts by mass of the finish treatment agent (B);

(9) The coating layer according to any one of embodiments (1) to (8), wherein the total amount of the components (b-1) and (b-2) is 0.06 to 20 parts by mass based on 100 parts by mass of the finish treatment agent (B);

(10) The coating layer according to any one of embodiments (1) to (9), wherein the amount of the component (b-3) is 3 to 15 parts by mass based on 100 parts by mass of the finish treatment agent (B);

(11) The coating layer according to any one of embodiments (1) to (10), wherein the saturated hydrocarbon solvent having 8 to 15 carbon atoms in the component (a-3) is an isoparaffin solvent;

(12) The coating layer according to any one of embodiments (1) to (11), wherein the component (a-3) comprises 100 parts by mass of a saturated hydrocarbon solvent having 8 to 15 carbon atoms;

(13) The coating layer according to any one of embodiments (1) to (12), wherein component (b-4) is an alcohol;

(14) The coating layer according to any one of embodiments (1) to (13), wherein the component (a-1) is a polydimethylsiloxane having hydrolyzable functional groups at both ends of the molecular chain;

(15) The coating layer according to any one of embodiments (1) to (13), wherein the component (a-1) is a polydimethylsiloxane having methoxy groups at both ends of the molecular chain;

(16) The coating layer according to any one of embodiments (1) to (15), wherein the component (a-2) is an organometallic compound; and

(17) The coating layer according to any one of embodiments (1) to (16), wherein the base material is the exterior of a vehicle.

The present invention also relates to:

(18) A method for forming a coating layer, the method comprising:
   (a) forming a layer (I) by applying 100 parts by mass in total of a film-forming agent (A) containing:

3 to 45 parts by mass of a polyorganosiloxane (a-1) having at least one hydrolyzable functional group in its molecule;

0.05 to 5 parts by mass of a curing catalyst (a-2); and 50 to 96.95 parts by mass of an organic solvent (a-3) comprising a saturated hydrocarbon solvent having 8 to 15 carbon atoms and an aromatic hydrocarbon solvent having 8 to 15 carbon atoms at a mass ratio of the saturated hydrocarbon solvent to the aromatic hydrocarbon solvent of 100/0 to 50/50, onto a base material and drying the film-forming agent (A) at environmental temperature for 5 to 90 minutes; and (b) forming a layer (II) by applying 100 parts by mass in total of a finish treatment agent (B) containing:

0.05 to 15 parts by mass of a polyorganosiloxane (b-1) having at least one pendant amino group (provided that the polyorganosiloxane (b-1) has one or less terminal amino group if the polyorganosiloxane (b-2) has a pendant amino group);

0.01 to 10 parts by mass of a polyorganosiloxane (b-2) having two or more terminal amino groups;

1 to 20 parts by mass, in terms of the solid content, of a silicone resin emulsion (b-3) emulsified with a nonionic or anionic surfactant;

0.1 to 25 parts by mass of a hydrophilic group-containing organic solvent (b-4); and 30 to 98.84 parts by mass of water (b-5), onto the layer (I) and drying the finish treatment agent (B) at environmental temperature for 10 minutes or more.

Preferred embodiments include:

(19) The method for forming a coating layer according to embodiment (18), wherein the film-forming agent (A) in step (a) is applied with a dry cloth, and the finish treatment agent (B) in step (b) is applied with a wet cloth;

(20) The method for forming a coating layer according to embodiment (18) or (19), wherein the amount of film-forming agent (A) in step (a) is 0.1 to 10 mL/m² of the base material;

(21) The method for forming a coating layer according to any one of embodiments (18) to (20), wherein the amount of finish treatment agent (B) in step (b) is 0.1 to 10 mL/m² of the base material;

(22) The method for forming a coating layer according to any one of embodiments (18) to (21), wherein the amount of the component (a-1) is 5 to 45 parts by mass based on 100 parts by mass of the film-forming agent (A);

(23) The method for forming a coating layer according to any one of embodiments (18) to (21), wherein the amount of the component (a-1) is 7 to 45 parts by mass based on 100 parts by mass of the film-forming agent (A);

(24) The method for forming a coating layer according to any one of embodiments (18) to (21), wherein the amount of the component (a-1) is 7 to 30 parts by mass based on 100 parts by mass of the film-forming agent (A);

(25) The method for forming a coating layer according to any one of embodiments (18) to (24), wherein the amount of the component (b-1) is 0.1 to 5 parts by mass based on 100 parts by mass of the finish treatment agent (B);

(26) The method for forming a coating layer according to any one of embodiments (18) to (25), wherein the amount of the component (b-2) is 0.1 to 3 parts by mass based on 100 parts by mass of the finish treatment agent (B);

(27) The method for forming a coating layer according to any one of embodiments (18) to (26), wherein the total amount of the components (b-1) and (b-2) is 0.06 to 20 parts by mass based on 100 parts by mass of the finish treatment agent (B);

(28) The method for forming a coating layer according to any one of embodiments (18) to (27), wherein the amount of the component (b-3) is 3 to 15 parts by mass based on 100 parts by mass of the finish treatment agent (B);

(29) The method for forming a coating layer according to any one of embodiments (18) to (28), wherein the saturated hydrocarbon solvent having 8 to 15 carbon atoms in the component (a-3) is an isoparaffin solvent;

(30) The method for forming a coating layer according to any one of embodiments (18) to (29), wherein the component (a-3) comprises 100 parts by mass of a saturated hydrocarbon solvent having 8 to 15 carbon atoms;

(31) The method for forming a coating layer according to any one of embodiments (18) to (30), wherein the component (b-4) is an alcohol;

(32) The method for forming a coating layer according to any one of embodiments (18) to (31), wherein the component (a-1) is a polydimethylsiloxane having hydrolyzable functional groups at both ends of the molecular chain;

(33) The method for forming a coating layer according to any one of embodiments (18) to (31), wherein the component (a-1) is a polydimethylsiloxane having methoxy groups at both ends of the molecular chain;

(34) The method for forming a coating layer according to any one of embodiments (18) to (33), wherein the component (a-2) is an organometallic compound; and

(35) The method for forming a coating layer according to any one of embodiments (18) to (34), wherein the base material is the exterior of a vehicle.

Advantageous Effects of Invention

The coating layer of the present invention can impart excellent water repellency and satisfactory gloss to a base material, for example, to the exterior of a vehicle. The agents used in the method for forming a coating layer of the present invention have excellent storage stability and dispersibility and also show excellent workability during application, and the resulting coating layer can impart excellent water repellency and satisfactory gloss to a base material, for example, the exterior of a vehicle.

DESCRIPTION OF EMBODIMENTS

The coating layer of the present invention includes a layer (I) formed by curing a film-forming agent (A) and layer (II) formed by solidifying a finish treatment agent (B), wherein the layer (I) is disposed on a base material side, and the layer (II) is disposed on the surface side, i.e., on the side closer to the air than the layer (I). Here, the film-forming agent (A) contains a polyorganosiloxane (a-1) having at least one hydrolyzable functional group in its molecule, a curing catalyst (a-2), and an organic solvent (a-3) comprising a saturated hydrocarbon solvent having 8 to 15 carbon atoms and an aromatic hydrocarbon solvent having 8 to 15 carbon atoms at a mass ratio of the saturated hydrocarbon solvent to the aromatic hydrocarbon solvent of 100/0 to 50/50 in 100 parts by total mass. The finish treatment agent (B) contains a polyorganosiloxane (b-1) having at least one pendant amino group (provided that the polyorganosiloxane (b-1) has one or less terminal amino group if the polyorganosiloxane (b-2) has a pendant amino group), a polyorganosiloxane (b-2) having two or more terminal amino groups, a silicone resin emulsion (b-3) emulsified with a nonionic or anionic surfactant, a hydrophilic group-containing organic solvent (b-4), and water (b-5) in 100 parts by total mass.

The polyorganosiloxane (a-1) contained in the film-forming agent (A) has at least one hydrolyzable functional group in the molecule. The number of the hydrolyzable functional group is preferably 2 to 6. The hydrolyzable functional groups may be terminal groups or pendant groups and are preferably terminal groups from the viewpoint of high strength of the formed film. Examples of the hydrolyzable functional groups include alkoxy groups, aminoxy groups, ketoxime groups, alkenyloxy groups, amido groups, and acetoxy groups. The hydrolyzable functional groups are preferably alkoxy groups and more preferably a methoxy group, an ethoxy group, or a propoxy group. The use of the polyorganosiloxane having such a group can achieve further satisfactory curing and can reduce odor during working. The component (a-1) is a polyorganosiloxane preferably having hydrolyzable functional groups, more preferably methoxy groups, at both ends of the molecular chain. The viscosity (25° C.) of the component (a-1) is measured in accordance with JIS Z 8803, and the upper limit thereof is preferably 1,000 $mm^2s^{-1}$ and more preferably 500 $mm^2s^{-1}$, and the lower limit is preferably 10 $mm^2s^{-1}$ and more preferably 50 $mm^2s^{-1}$.

The curing catalyst (a-2) is preferably an organometallic compound. Usable examples of the organometallic compound include compounds of tin, titanium, aluminum, zirconium, and lead. Examples of the tin compounds include tin octylate, dibutyltin diacetate, dibutyltin dioctylate, dibutyltin dilaurate, dibutyltin malate, and dibutyltin bisoctyloxycarbonyl methylthiolate. Examples of the titanium compound include tetrabutyl titanate, tetramethoxytitanium, tetraethoxytitanium, tetrapropoxytitanium, tetraisopropoxytitanium, tetrabutoxytitanium, tetrakis(ethylene glycol monomethyl ether) titanate, tetrakis(ethylene glycol monoethyl ether) titanate, tetrakis(ethylene glycol monobutyl ether) titanate, diisopropoxybis(acetylacetonate) titanate, diisopropoxybis(ethylacetoacetate) titanate, and tetrakis(2-butoxyethyl alcoholate) titanate. Examples of the aluminum compound include trimethoxyaluminum, triethoxyaluminum, triisopropoxyaluminum, aluminum diisopropoxy(ethylacetoacetate), aluminum isopropoxybis(ethylacetoacetate), aluminum tris(ethylacetoacetate), and tris(acetylacetone)aluminum. Examples of the zirconium compound include acetylacetone zirconium, triscetylacetone zirconium, tetrakis(ethylene glycol monomethyl ether)zirconium, tetrakis(ethylene glycol monoethyl ether)zirconium, tetrakis(ethylene glycol monobutyl ether)zirconium, zirconium dibutoxybis(ethylacetoacetate), and zirconium tetrakis(2-butoxyethyl alchoholate). Examples of the lead compound include lead octylate and lead naphthenate. These organometallic compounds, which can impart desired properties to the finally formed coating layer, can be used without limitation. In the present invention, titanium compounds are preferably used.

The curing catalyst (a-2) may further contain a compound that causes a curing reaction of the polyorganosiloxane (a-1) having at least one hydrolyzable functional group in its molecule, in addition to the organometallic compound. The amount of such a compound is preferably 10 parts by mass or less, more preferably 5 parts by mass or less, and 0.001 parts by mass or more, more preferably 0.01 parts by mass or more, based on 100 parts by mass of the organometallic compound. Examples of the compounds include butylamine, dibutylamine, hexylamine, t-butylamine, ethylenediamine, triethylamine, ethanolamine, diethanolamine, triethanolamine, ethylenediamine, triethylenediamine, imidazole, isophoronediamine, ammonia, sodium hydroxide, potassium hydroxide, phosphoric acid, monoalkyl phosphate, dialkyl phosphate, monoalkyl phosphite, dialkyl phosphite, p-toluenesulfonic acid, trichloroacetic acid, and fluorine compounds. In the present invention, any one appropriately selected from these compounds can be used.

The organic solvent (a-3) comprises a saturated hydrocarbon solvent having 8 to 15 carbon atoms and an aromatic hydrocarbon solvent having 8 to 15 carbon atoms as an optional component. The mass ratio of the saturated hydrocarbon solvent having 8 to 15 carbon atoms to the aromatic hydrocarbon solvent having 8 to 15 carbon atoms is preferably 100/0 to 50/50, more preferably 100/0 to 80/20, and most preferably 100/0, from the viewpoint of odor and volatility. The component (a-3) dissolves and disperses the components (a-1) and (a-2) therein and evaporates after being applied to be substantially absent in the layer (I). The saturated hydrocarbon solvent of which number of carbon atoms is adjusted to 8 to 15 can satisfactorily dissolve and disperse the components (a-1) and (a-2) therein. In addition, it can keep a good balance between volatility and viscosity, which highly affect the workability during application. If the number of carbon atoms is less than the lower limit, the volatility is too high, which enforces significantly rapid application operation to reduce the workability. In contrast, if the number of carbon atoms is higher than the upper limit, the volatility is too low, which requires a long period of time before the subsequent step, for example, the application of the finish treatment agent (B), and the resulting film-forming agent (A) has a high viscosity, which makes formation of a smooth coating film difficult when the application of the agent is performed by hand work. Examples of the solvent include normal paraffin or isoparaffin compounds having linear or branched chains selected from, for example, n-octane, isooctane, n-nonane, isononane, n-decane, isodecane, n-undecane, isoundecane, n-dodecane, isododecane, n-tridecane, isotridecane, n-tetradecane, isotetradecane, n-pentadecane, isopentadecane, and structural isomers thereof. Among these solvents, isoparaffin solvents are preferably used. These solvents may be used alone or in the form of a mixture. Appropriate solvents can be selected for adjusting the flash point and volatility. The aromatic hydrocarbon solvent having 8 to 15 carbon atoms is an organic solvent consisting of a compound having an aromatic ring other than the saturated hydrocarbon solvent and is a distillation fraction of crude petroleum of which main component has 8 to 15 carbon atoms. Examples thereof include mesitylene, hemimellitene, pseudocumene, ethyltoluene, cumene, prehnitene, isodurene, durene, propylbenzene, mellitene, cymene, and bibenzyl. The aromatic hydrocarbon solvent may be a commercially available one, and particularly preferred examples thereof include Ipzole 100 (trademark, mainly composed of aromatic hydrocarbon having 9 carbon atoms) and Ipzole 150 (trademark, mainly composed of aromatic hydrocarbon having 10 carbon atoms) manufactured by Idemitsu Kosan Co., Ltd.; Swazole 1000 (trademark, mainly composed of aromatic hydrocarbon having 8 to 10) manufactured by Maruzen Petrochemical Co., Ltd.; Solvesso 100 (trademark, dialkyl and trialkylbenzene having 9 or 10 carbon atoms), Solvesso 150 (trademark, mainly composed of alkylbenzene having 10 or 11 carbon atoms), and Solvesso 200 (trademark, mainly composed of alkylnaphthalene having 10 to 14 carbon atoms) manufactured by Exxon Mobil Chemical Company; Cactus Solvent P-100 (trademark, alkylbenzene having 9 or 10 carbon atoms), Cactus Solvent P-180 (trademark, a mixture of methylnaphthalene and dimethylnaphthalene), Cactus Solvent P-200 (trademark, a mixture of methylnaphthalene and dimethylnaphthalene), Cactus Solvent P-220 (trademark, a mixture of methylnaphthalene and dimethylnaphthalene) manufactured by Japan Energy Corporation; and Shellsol A150 (trademark, a mixture of naphthalene and trimethylbenzene) manufactured by Shell Chemicals Ltd.

The amounts of the polyorganosiloxane (a-1) having at least one hydrolyzable functional group in its molecule, the curing catalyst (a-2), and the organic solvent (a-3) comprising a saturated hydrocarbon solvent having 8 to 15 carbon atoms and an aromatic hydrocarbon solvent having 8 to 15 carbon atoms as an optional component are as follows. The amount of the component (a-1) is 45 parts by mass or less, preferably 30 parts by mass or less, and 3 parts by mass or more, preferably 5 parts by mass or more, and more preferably 7 parts by mass or more, based on 100 parts by mass of the total amount of the components (a-1), (a-2), and (a-3). An amount less than the lower limit cannot form a tough cured film, whereas an amount exceeding the upper limit decreases the workability during application and also makes the formation of a smooth film difficult.

The amount of the component (a-2) is 5 parts by mass or less, preferably 3 parts by mass or less, and 0.05 parts by mass or more, preferably 0.5 parts by mass or more, based on 100 parts by mass of the total amount of the components (a-1), (a-2), and (a-3). An amount less than the lower limit makes curing insufficient, which prevents formation of a satisfactory film, whereas an amount exceeding the upper limit deteriorates the storage stability of the film-forming agent (A).

The amount of the component (a-3) is controlled such that the total amount of the components (a-1), (a-2), and (a-3) is 100 parts by mass. That is, the amount of the component (a-3) is 96.95 parts by mass or less, preferably 95 parts by mass or less, and 50 parts by mass or more, based on 100 parts by mass of the total amount of the components (a-1), (a-2), and (a-3). An amount of less than the lower limit makes the viscosity of the film-forming agent (A) too high and thereby makes the formation of a smooth film difficult.

In the present invention, the layer (I), which is formed by curing the film-forming agent (A) containing the components (a-1), (a-2), and (a-3), is disposed on the base material side. The layer (I) can be formed by applying the film-forming agent (A) onto a base material directly or with another layer therebetween. The film-forming agent (A) is preferably directly applied onto a base material. In the layer (I), the component (a-1) exhibits a strong adhesiveness through chemical reaction with a member to which the film-forming agent (A) is applied. In addition, the component (a-1) itself cures through cross-linking reaction to impart particularly excellent water repellency to the entire coating layer.

The polyorganosiloxane (b-1) contained in the finish treatment agent (B) may be any one having at least one pendant amino group. The (b-1) may have one or more terminal amino groups. If the (b-2) described below has a pendant amino group, the (b-1) has one or less terminal amino group. In other words, if the (b-2) has at least one pendant amino group and two or more terminal amino groups, the (b-1) has at least one pendant amino group and no or one terminal amino group. If the (b-2) have no pendant amino group and two or more terminal amino groups, the (b-1) has at least one pendant amino group and no or one or more terminal amino groups. The component (b-1) functions so as to allow the layer (II) formed by application of the finish treatment agent (B) to adhere to the layer (I) formed by application of the film-forming agent (A), and thereby water repellency is imparted to the entire coating layer. The upper limit of the functional group equivalent weight of the component polyorganosiloxane (b-1) is preferably 100,000 and more preferably 10,000, whereas the lower limit is preferably 300 and more preferably 500. In addition, the viscosity (25° C.) of the component (b-1) is measured in accordance with JIS Z 8803, and the upper limit is preferably 30,000 $mm^2s^{-1}$ and more preferably 3,000 $mm^2s^{-1}$, while the lower limit is preferably 10 $mm^2s^{-1}$ and more preferably 50 $mm^2s^{-1}$. A viscosity exceeding the upper limit increases the viscosity of the entire finish treatment agent (B), which may prevent application of a smooth and uniform layer, whereas a viscosity less than the lower limit may also prevent application of a smooth and uniform layer. These polyorganosiloxanes may be used alone or in combination of two or more thereof, as the component (b-1).

The polyorganosiloxane component (b-2) of the present invention has two or more terminal amino groups. The component (b-2), together with the component (b-1), imparts water repellency to the entire coating layer. The upper limit of the functional group equivalent weight of the component polyorganosiloxane (b-2) is preferably 10,000 and more preferably 5,000, whereas the lower limit is preferably 50 and more preferably 100. In addition, the viscosity (25° C.) of component (b-2) is measured in accordance with JIS Z 8803, and the upper limit is preferably 1,000 $mm^2s^{-1}$ and more preferably 500 $mm^2s^{-1}$, and the lower limit is preferably 1 $mm^2s^{-1}$ and more preferably 10 $mm^2s^{-1}$. A viscosity exceeding the upper limit increases the viscosity of the entire finish treatment agent (B), which may prevent application of a smooth and uniform layer, whereas a viscosity lower than the lower limit may also prevent application of a smooth and uniform layer. These polyorganosiloxanes may be used alone or in combination of two or more thereof, as the component (b-2).

The silicone resin emulsion (b-3) emulsified with a nonionic or anionic surfactant of the present invention is prepared by emulsifying a silicone resin having a polyorganosiloxane skeleton with a nonionic or anionic surfactant and imparts slippage to the finish treatment agent (B) for smoothening the layer (II) formed by solidifying the finish treatment agent (B). The solid content contained in the component (b-3) is preferably 5% to 90% by mass and more preferably 10% to 50% by mass. The upper limit of the pH of the silicone resin emulsion (b-3) is preferably 6.4 and more preferably 6.1, while the lower limit thereof is preferably 4.0 and more preferably 5.0. A pH exceeding the upper limit makes the emulsion unstable, whereas a pH of lower than the lower limit may erode the surface of a member to which the finish treatment agent (B) is applied. Examples of the component (b-3) include an emulsion prepared by dissolving trimethyl siloxysilicate having a viscosity of 2000 cSt (25° C.) in dimethylpolysiloxane having a viscosity of 350 cSt and emulsifying and dispersing the solution in water with a nonionic surfactant [trimethyl siloxysilicate content: 12% by mass, dimethylpolysiloxane content: 28% by mass, pH: 6, R2701 (trademark) manufactured by Wacker Asahikasei Silicone Co., Ltd.], an emulsion of a silicone resin oil [solid content: 40% by mass, pH: 6, NP2804 (trademark) manufactured by Wacker Asahikasei Silicone Co., Ltd.], and an amino silicone emulsion [solid content: 40% by mass, pH: 6, NP2609 (trademark) manufactured by Wacker Asahikasei Silicone Co., Ltd.].

The hydrophilic group-containing organic solvent (b-4) dissolves and disperses the components (b-1), (b-2), and (b-3) therein and evaporates after being applied to be substantially absent in the layer (II). The hydrophilic group is a functional group, such as an OH, COOH, or $NH_2$ group, which contributes to hydration. The hydrophilic group-containing organic solvent is an organic solvent comprising compound miscible with water in a ratio. Examples of the compound particularly preferably used as the component (b-4) include alcohols miscible with water, such as methanol, ethanol, 1-propanol, 2-propanol, butanol, ethylene glycol, diethylene glycol, triethylene glycol, propylene glycol, methyl cellosolve, ethyl cellosolve, 1,3-butanediol, 1,4-butanediol, hexanetriol, glycerin, neopentyl glycol, and pentaerythritol. These solvents may be used alone or in the form of a mixture. In addition, for example, the viscosity, flash point, and volatility can be adjusted by selecting appropriate solvents from these solvents.

The water (b-5) dissolves or disperses the components (b-1), (b-2), (b-3), and (b-4) in the finish treatment agent (B) to keep a good balance between volatility and storage stability and evaporates after being applied to be substantially absent in the layer (II).

The amounts of the polyorganosiloxane (b-1) having at least one pendant amino group, the polyorganosiloxane (b-2) having two or more terminal amino groups, the silicone resin emulsion (b-3) emulsified with a nonionic or anionic surfactant, the hydrophilic group-containing organic solvent (b-4), and water (b-5) are as follows. The amount of the component (b-1) is 15 parts by mass or less, preferably 5 parts by mass or less, and 0.05 parts by mass or more, preferably 0.1 parts by mass or more, based on 100 parts by mass of the total amount of the components (b-1), (b-2), (b-3), (b-4), and (b-5). An amount less than the lower limit cannot exhibit desired water repellency, whereas an amount exceeding the upper limit decreases the storage stability.

The amount of the component (b-2) is 10 parts by mass or less, preferably 3 parts by mass or less, and 0.01 parts by mass or more, preferably 0.1 parts by mass or more, based on 100 parts by mass of the total amount of the components (b-1), (b-2), (b-3), (b-4), and (b-5). An amount less than the lower limit cannot exhibit satisfactory gloss, whereas an amount exceeding the upper limit may decrease the storage stability. In the present invention, the upper limit of the total amount of the components (b-1) and (b-2) is preferably 20 parts by mass. Such a total amount of the components (b-1) and (b-2) can exhibit water repellency and gloss while keeping satisfactory storage stability.

The amount of the component (b-3) is 20 parts by mass or less, preferably 15 parts by mass or less, and 1 part by mass or more, preferably 3 parts by mass or more, based on 100 parts by mass of the total amount of the components (b-1), (b-2), (b-3), (b-4), and (b-5). An amount less than the lower limit cannot exhibit desired slippage, whereas an amount exceeding the upper limit causes coagulation of the finish treatment agent (B) to decrease the storage stability.

The amount of the component (b-4) is 25 parts by mass or less, preferably 15 parts by mass or less, and 0.1 parts by mass or more, preferably 1 part by mass or more, based on 100 parts by mass of the total amount of the components (b-1), (b-2), (b-3), (b-4), and (b-5). An amount less than the lower limit cannot sufficiently dissolve and disperse the components (b-1) and (b-2) and decreases the volatility of the finish treatment agent (B) as a whole to reduce the workability, whereas an amount exceeding the upper limit makes the emulsion of the component (b-3) unstable to decrease the storage stability of the finish treatment agent (B) and also increases the volatility to decrease the workability because the application of the finish treatment agent (B) must be completed within a significantly short period.

The amount of the component (b-5) is controlled such that the total amount of the components (b-1), (b-2), (b-3), (b-4), and (b-5) is 100 parts by mass. That is, the amount of the component (b-5) is 98.84 parts by mass or less and 30 parts by mass or more, preferably 70 parts by mass or more, based on 100 parts by mass of the total amount of the components (b-1), (b-2), (b-3), (b-4), and (b-5). An amount within the range can keep a good balance between the volatility and the storage stability of the finish treatment agent (B).

The finish treatment agent (B) of the present invention can further contain a variety of components as necessary within the range that does not impair the advantageous effects of the present invention. Examples of the additional components include antirust agents, antiseptics, surfactants, pH adjusters, antifreezing agents, UV absorbers, and stabilizers.

In the present invention, the layer (II) can be formed by applying the finish treatment agent (B) containing the components (b-1), (b-2), (b-3), (b-4), and (b-5) onto the layer (I) and solidifying the finish treatment agent (B). The formed layer (II) can increase the volatility and the gloss through interaction with the layer (I). In addition, the layer (II) can be formed as a thick film and thereby can fill into the uneven portions of the layer (I) to form a smooth coating layer as a whole.

The film-forming agent (A) and the finish treatment agent (B) are applied onto a base material as described below and are respectively cured and solidified. The film-forming agent (A) is preferably applied with a dry cloth onto a base material or a layer formed on a base material in advance. Herein, the dry cloth is usually a cloth preferably containing 20% or less, more preferably 5% or less, of moisture, and examples of the cloth include fabrics made from synthetic fibers such as polyester, nylon, polyester/nylon conjugated fibers, polyurethane, and polyvinyl chloride; and fabrics made from natural fibers such as cotton, silk, hemp, rayon, cashmere, and mohair. From the balance between the strength of fibers and the permeability of a coating liquid, a fabric made from synthetic fibers selected from polyester, nylon, and polyester/nylon conjugated fibers is particularly preferred. The amount of the film-forming agent (A) varies depending on the type of the base material and the types of the agents to be applied and is usually 0.1 to 10 mL/m$^2$ of the application area. The application to a base material or another material is usually performed by hand work with a dry cloth, and can also be performed by a machine. The applied film-forming agent (A) is cured through the progress of cross-linking for 5 to 90 minutes, preferably 10 to 30 minutes, at environmental temperature to form a film. Thus, the layer (I) is formed by curing of the film-forming agent (A). The thickness of the layer (I) can be appropriately changed by varying the amount of the film-forming agent (A) and is usually 0.1 to 0.5 μm.

Subsequently, the finish treatment agent (B) is applied onto the layer (I). The finish treatment agent (B) is preferably applied with a wet cloth. Herein, the wet cloth is most preferably a fabric having a water retention value of 600% or less, more preferably within a range of 190% to 230%, as a value specified in JIS L 1906 and a water absorption value of 4 seconds or less, preferably 2 seconds or less, as a value specified in JIS L 1907 and containing 50% or more of water. Examples of the fabric used as the wet cloth include, as in the dry cloth, fabrics made from synthetic fibers such as polyester, nylon, polyester/nylon conjugated fibers, polyurethane, and polyvinyl chloride; and fabrics made from natural fibers such as cotton, silk, hemp, rayon, cashmere, and mohair. These fabrics preferably have water retention values and water absorption values within the above-specified ranges. The amount of the finish treatment agent (B) can be varied in light of the smoothness and other factors of the layer (I) formed by curing the film-forming agent (A) and is usually 0.1 to 10 mL/m$^2$ of the application area. As in above, the application is usually performed by hand work with a wet cloth, and can also be performed by a machine The applied finish treatment agent (B) is solidified at environmental temperature for 10 minutes or more, preferably 30 minutes or more and 240 minutes or less, to form a film. Thus, the layer (II) is formed by solidification of the finish treatment agent (B). The thickness of the layer (II) can be appropriately changed by varying the amount of the finish treatment agent (B) and is usually 0.1 to 0.5 μm.

In the present invention, the base material onto which the coating layer is formed may be of any type. For example, the coating layer is formed on the exterior of a vehicle, preferably a painted surface of an automobile. The amounts of the film-forming agent (A) and the finish treatment agent (B) applied to a painted surface of an automobile are each usually about 50 mL for a light automobile, about 60 to 70 mL for an ordinary automobile, and about 80 mL for a minivan, as a rough standard. In the present invention, an additional layer may be disposed between the layer (I) and the layer (II) by applying another film-forming agent having a film-formable composition. Such a film-forming agent may be the film-forming agent (A) of the present invention, that is, the film-forming agent (A) may be over-coated. In the present invention, after the formation of the layer (II), another layer may be further formed on the surface.

The present invention will now be described in more detail by examples, which are not intended to limit the invention.

EXAMPLES

[Preparation of Film-Forming Agent (A) and Finish Treatment Agent (B)]
Materials The materials used for preparing the film-forming agent (A) and the finish treatment agent (B) are as follows.
<Component (a-1): Polyorganosiloxane Having at Least One Hydrolyzable Functional Group in its Molecule>

(i) Methoxy functional polydimethylsiloxane [X-40-9225 (trademark) manufactured by Shin-Etsu Chemical Co., Ltd., a polydimethylsiloxane having pendant methoxy groups and terminal methoxy groups on both sides, the methoxy group content: 24% by weight, viscosity (measured in accordance with JIS Z 8803): 100 $mm^2s^{-1}$]

(ii) Methoxy functional polydimethylsiloxane [X-40-9250 (trademark) manufactured by Shin-Etsu Chemical Co., Ltd., a polydimethylsiloxane having pendant methoxy groups and terminal methoxy groups on both sides, methoxy group content: 25% by weight, viscosity (measured in accordance with JIS Z 8803): 160 $mm^2s^{-1}$]

(iii) Methoxy functional methyl/phenyl substituted polysiloxane [KR-401N (trademark) manufactured by Shin-Etsu Chemical Co., Ltd., a methyl/phenyl substituted polysiloxane having pendant methoxy groups and terminal methoxy groups on both sides, methoxy group content: 33% by weight, viscosity (measured in accordance with JIS Z 8803): 20 $mm^2s^{-1}$]

(iv) Methoxy functional methyl/phenyl substituted polysiloxane [KR-510 (trademark) manufactured by Shin-Etsu Chemical Co., Ltd., a methyl/phenyl substituted polysiloxane having pendant methoxy groups and terminal methoxy groups on both sides, methoxy group content: 17% by weight, viscosity (measured in accordance with JIS Z 8803): 100 $mm^2s^{-1}$]
<Comparative Component (a-1)>

(i) Polydimethylsiloxane with both ends blocked with methyl groups [KF-96-100CS (trademark) manufactured by Shin-Etsu Chemical Co., Ltd., viscosity (measured in accordance with JIS Z 8803): 100 $mm^2s^{-1}$]

<Component (a-2): Curing Catalyst Containing an Organometallic Compound>

(i) Titanium alkoxide [D-20 (trademark) manufactured by Shin-Etsu Chemical Co., Ltd., metal content: 21% by weight]

(ii) Titanium alkoxide [D-25 (trademark) manufactured by Shin-Etsu Chemical Co., Ltd., metal content: 14% by weight]

(iii) Aluminum alkoxide [DX-9740 (trademark) manufactured by Shin-Etsu Chemical Co., Ltd., metal content: 9% by weight]
<Component (a-3): Saturated Hydrocarbon Solvent Having 8 to 15 Carbon Atoms>

(i) Isoparaffin hydrocarbon solvent [Isopar M (trademark) manufactured by Exxon Mobil Corporation, mainly composed of isoparaffin hydrocarbon having 12 to 15 carbon atoms, distillation temperature range: 225° C. to 254° C., flash point: 92° C.]

(ii) Isoparaffin hydrocarbon solvent [Isopar L (trademark) manufactured by Exxon Mobil Corporation, mainly composed of isoparaffin hydrocarbon having 11 to 13 carbon atoms, distillation temperature range: 185° C. to 199° C., flash point: 64° C.]

(iii) Aromatic hydrocarbon solvent [Solvesso 150 (trademark) manufactured by Exxon Mobil Corporation, heavy aromatic solvent naphtha composed of a mixture of aromatic hydrocarbons having 8 to 12 carbon atoms, distillation temperature range: 189° C. to 210° C., flash point: 65° C.]
<Comparative Component (a-3)>

(i) Isoparaffin hydrocarbon solvent [IP Clean HX (trademark) manufactured by Idemitsu Kosan Co., Ltd., mainly composed of isoparaffin hydrocarbon having 16 carbon atoms, distillation temperature range: 211° C. to 255° C., flash point: 84° C.]

(ii) Isohexene [isoolefin hydrocarbon having 6 carbon atoms, boiling point: 62° C., flash point: −26° C.] (Isohexene manufactured by Wako Pure Chemical Industries, Ltd.)

(iii) Isopropyl alcohol [Exxon Mobil IPA (trademark) manufactured by Exxon Mobil Corporation, distillation temperature: 80° C., flash point: 0° C. or less]

(iv) Ethylene glycol dimethyl ether [distillation temperature: 82° C. to 83° C., flash point: −1.5° C.] (ethylene glycol dimethyl ether manufactured by Nacalai Tesque, Inc.)
<Component (b-1): Polyorganosiloxane Having at Least One Amino Group on the Silicone Side Chain>

(i) Side chain type monoamino-modified polysiloxane [KF-865 (trademark) manufactured by Shin-Etsu Chemical Co., Ltd., functional group equivalent: 5,000 $gmol^{-1}$, viscosity (measured in accordance with JIS Z 8803): 110 $mm^2s^{-1}$, not having terminal amino groups]

(ii) Side chain type diamino-modified polysiloxane [KF-880 (trademark) manufactured by Shin-Etsu Chemical Co., Ltd., functional group equivalent: 1,800 $gmol^{-1}$, viscosity (measured in accordance with JIS Z 8803): 650 $mm^2s^{-1}$, not having terminal amino groups]

(iii) Side chain type aminopolyether both end-modified polysiloxane [X-22-3939A (trademark) manufactured by Shin-Etsu Chemical Co., Ltd., functional group equivalent: 1,500 $gmol^{-1}$, viscosity (measured in accordance with JIS Z 8803): 3,300 $mm^2s^{-1}$, not having terminal amino groups]
<Comparative Component (b-1)>

(i) Side chain type epoxy modified polysiloxane [X-22-343 (trademark) manufactured by Shin-Etsu Chemical Co., Ltd., functional group equivalent: 525 $gmol^{-1}$, viscosity (measured in accordance with JIS Z 8803): 25 $mm^2s^{-1}$]

(ii) Side chain type epoxyether both end-modified polysiloxane [X-22-4741 (trademark) manufactured by Shin-Etsu Chemical Co., Ltd., functional group equivalent: 2,500 gmol$^{-1}$, viscosity (measured in accordance with JIS Z 8803): 350 mm$^2$s$^{-1}$]

<Component (b-2): Polyorganosiloxane Having Two or More Terminal Amino Groups>

(i) Terminal type diamino-modified polysiloxane [X-22-161B (trademark) manufactured by Shin-Etsu Chemical Co., Ltd., having one terminal amino group at each end, functional group equivalent: 1500 gmol$^{-1}$, viscosity (measured in accordance with JIS Z 8803): 55 mm$^2$s$^{-1}$, not having pendant amino groups]

<Comparative Component (b-2)>

(i) Terminal type carboxyl modified polysiloxane [X-22-162C (trademark) manufactured by Shin-Etsu Chemical Co., Ltd., functional group equivalent: 2,300 gmol$^{-1}$, viscosity (measured in accordance with JIS Z 8803): 220 mm$^2$s$^{-1}$]

(ii) Terminal type silanol modified polysiloxane [KF-9701 (trademark) manufactured by Shin-Etsu Chemical Co., Ltd., functional group equivalent: 1,500 gmol$^{-1}$, viscosity (measured in accordance with JIS Z 8803): 60 mm$^2$s$^{-1}$]

<Component (b-3): Silicone Resin Emulsion Emulsified with Nonionic or Anionic Surfactant>

(i) Anionic dispersible silicone resin emulsion [R2701 (trademark) manufactured by Wacker Asahikasei Silicone Co., Ltd., solid content: 40%, pH 6]

(ii) Nonionic dispersible silicone resin emulsion [NR2706 (trademark) manufactured by Wacker Asahikasei Silicone Co., Ltd., solid content: 55%, pH 6]

(iii) Nonionic dispersible amino-modified silicone resin emulsion [NP2609 (trademark) manufactured by Wacker Asahikasei Silicone Co., Ltd., solid content: 40%, pH 6]

<Comparative Component (b-3)>

(i) Cationic dispersible silicone resin emulsion [Polon MF-52 (trademark) manufactured by Shin-Etsu Chemical Co., Ltd., solid content: 32%, pH 6.5]

<Component (b-4): Hydrophilic Group-Containing Organic Solvent>

(i) Isopropyl alcohol (Exxon Mobil IPA manufactured by Exxon Mobil Corporation)

(ii) Normal-propyl alcohol (normal-propyl alcohol manufactured by Sankyo Chemical Co., Ltd.)

(iii) Ethanol (ethanol manufactured by Sankyo Chemical Co., Ltd.)

(iv) Ethylene glycol (ethylene glycol manufactured by Sankyo Chemical Co., Ltd.)

<Comparative Component (b-4)>

(i) Ethylene glycol dimethyl ether (dimethyl glycol manufactured by Nippon Nyukazai Co., Ltd.)

<Preparation of Film-Forming Agent (A)>

Components (a-1), (a-2), and (a-3) and comparative components (a-1) and (a-3) were mixed with stirring at mixing ratios shown in Tables 1 and 2 at room temperature to prepare film-forming agents (A-1) to (A-10) and comparative film-forming agents (A'-1) to (A'-9). The storage stability and the odor of each of the film-forming agents and the comparative film-forming agents were evaluated.

<Preparation of Finish Treatment Agent (B)>

Components (b-1), (b-2), (b-3), and (b-4) and comparative components (b-1), (b-2), (b-3), and (b-4) were mixed with stirring at mixing ratios shown in Tables 3 and 4 at room temperature to prepare finish treatment agents (B-1) to (B-11) and comparative finish treatment agents (B'-1) to (B'-10). The dispersibility and the storage stability of each of the finish treatment agents and the comparative finish treatment agents were evaluated.

The film-forming agents, the comparative film-forming agents, the finish treatment agents, and the comparative finish treatment agents were evaluated by the following tests.

<Storage Stability>

A film-forming agent (A) was filtered through a 200-mesh stainless steel sieve to collect 100 mL thereof. The whole of the collected film-forming agent (A) was sealed in a glass container. A finish treatment agent (B) was similarly filtered to collect 100 mL thereof. The whole of the collected finish treatment agent (B) was sealed in a polyethylene airtight container. The film-forming agent (A) and the finish treatment agent (B) were stored at 40° C. for 30 days and then at −5° C. for 30 days. Subsequently, the appearance of each agent was evaluated by visual inspection. The results of the film-forming agent (A) and the finish treatment agent (B) are indicated by the following symbols:

Evaluation Criteria of Film-Forming Agent (A):

○: No turbidness, discoloration, precipitation, and deposition of crystal substance were observed in the solution, Δ: Any one of turbidness, discoloration, precipitation, and deposition of crystal substance was observed in the solution, and x: Any two or more of turbidness, discoloration, precipitation, and deposition of crystal substance were observed in the solution.

Evaluation Criteria of Finish Treatment Agent (B):

○: No discoloration, aggregation of dispersoids, or separation of liquid phase were observed, Δ: Any one of discoloration, aggregation of dispersoids, and separation of liquid phase was observed, and x: Any two or more of discoloration, aggregation of dispersoids, and separation of liquid phase were observed.

<Odor>

About 20 mL of a film-forming agent (A) was hermetically sealed in a glass container and was left to stand at room temperature for 5 minutes. Subsequently, the container was opened to smell the agent for evaluating the odor. The results are indicated by the following symbols:

○: Slight odor was noticed,

Δ: Rather strong odor was noticed, and x: Very strong odor was noticed.

<Dispersibility>

A finish treatment agent (B) was filtered through a 200-mesh stainless steel sieve to collect 100 mL thereof. The collected finish treatment agent (B) was sealed in a polyethylene airtight container and was left to stand at ordinary temperature. Changes in appearance with time were evaluated by visual inspection. The results are indicated by the following symbols:

○: The completely uniform state of the solution was maintained even after 30 days, Δ: Coagulation and precipitation were observed after passage of 10 days or more and less than 30 days, and x: Coagulation and precipitation were observed after passage of less than 10 days.

The results are shown in Tables 1 and 2 and Tables 3 and 4.

TABLE 1

| | Film-forming agent (A) | | Compound example | | | | | | | | | |
|---|---|---|---|---|---|---|---|---|---|---|---|---|
| Component | Composition | | A-1 | A-2 | A-3 | A-4 | A-5 | A-6 | A-7 | A-8 | A-9 | A-10 |
| a-1 | (i) Methoxy functional polydimethylsiloxane X-40-9225 | | 10 | 10 | 15 | 20 | 5 | 10 | 15 | 10 | 10 | 10 |
| | (ii) Methoxy functional polydimethylsiloxane X-40-9250 | | 10 | 10 | — | 20 | 5 | 10 | — | 10 | 10 | 10 |
| | (iii) Methoxy functional methyl/phenyl substituted polysiloxane KR-401N | | — | — | — | — | — | — | 5 | — | — | — |
| | (iv) Methoxy functional methyl/phenyl substituted polysiloxane KR-510 | | — | — | 5 | — | — | — | — | — | — | — |
| | Comparative (i) Polydimethylsiloxane with both ends blocked with methyl groups KF-96-100C | | — | — | — | — | — | — | — | — | — | — |
| a-2 | (i) Titanium alkoxide D-20 | | 1 | — | 1 | 1 | 1 | — | — | — | — | 1 |
| | (ii) Titanium alkoxide D-25 | | — | 1 | — | — | — | 0.5 | 1 | — | 1 | — |
| | (iii) Aluminum alkoxide DX-9740 | | — | — | — | — | — | 0.5 | — | 1.5 | — | — |
| a-3 | (i) Isoparaffin hydrocarbon solvent Isopar M | | 79 | 79 | 79 | 59 | 89 | 79 | 79 | 79 | — | 50 |
| | (ii) Isoparaffin hydrocarbon solvent Isopar L | | — | — | — | — | — | — | — | — | 79 | — |
| | Comparative (i) Isoparaffin hydrocarbon solvent IP Clean HX | | — | — | — | — | — | — | — | — | — | — |
| | Comparative (ii) Isohexene | | — | — | — | — | — | — | — | — | — | — |
| | Comparative (iii) Aromatic hydrocarbon solvent Solvesso 150 | | — | — | — | — | — | — | — | — | — | 29 |
| | Comparative (iv) Isopropyl alcohol | | — | — | — | — | — | — | — | — | — | — |
| | Comparative (v) Ethylene glycol dimethyl ether | | — | — | — | — | — | — | — | — | — | — |
| | | Total | 100 | 100 | 100 | 100 | 100 | 100 | 100 | 100 | 100 | 100 |
| Properties | Storage stability | | ○ | ○ | ○ | ○ | ○ | ○ | ○ | ○ | ○ | ○ |
| | Odor | | ○ | ○ | ○ | ○ | ○ | ○ | ○ | ○ | ○ | Δ |

TABLE 2

| | Film-forming agent (A) | | Comparative compound example | | | | | | | | |
|---|---|---|---|---|---|---|---|---|---|---|---|
| Component | Composition | | A'-1 | A'-2 | A'-3 | A'-4 | A'-5 | A'-6 | A'-7 | A'-8 | A'-9 |
| a-1 | (i) Methoxy functional polydimethylsiloxane X-40-9225 | | — | 20 | 10 | 10 | 10 | 10 | 10 | 10 | 10 |
| | (ii) Methoxy functional polydimethylsiloxane X-40-9250 | | — | 30 | 10 | 10 | 10 | 10 | 10 | 10 | 10 |
| | (iii) Methoxy functional methyl/phenyl substituted polysiloxane KR-401N | | — | — | — | — | — | — | — | — | — |
| | (iv) Methoxy functional methyl/phenyl substituted polysiloxane KR-510 | | — | — | — | — | — | — | — | — | — |
| | Comparative (i) Polydimethylsiloxane with both ends blocked with methyl groups KF-96-100C | | 20 | — | — | — | — | — | — | — | — |
| a-2 | (i) Titanium alkoxide D-20 | | — | — | — | — | — | — | — | — | — |
| | (ii) Titanium alkoxide D-25 | | 1 | 1 | 1 | 1 | 1 | 1 | 1 | 1 | 1 |
| | (iii) Aluminum alkoxide DX-9740 | | — | — | — | — | — | — | — | — | — |
| a-3 | (i) Isoparaffin hydrocarbon solvent Isopar M | | 79 | 49 | — | — | — | — | — | 50 | 29 |
| | (ii) Isoparaffin hydrocarbon solvent Isopar L | | — | — | — | — | — | — | — | — | — |
| | Comparative (i) Isoparaffin hydrocarbon solvent IP Clean HX | | — | — | 79 | — | — | — | — | — | — |
| | Comparative (ii) Isohexene | | — | — | — | 79 | — | — | — | — | — |
| | Comparative (iii) Aromatic hydrocarbon solvent Solvesso 150 | | — | — | — | — | 79 | — | — | — | — |
| | Comparative (iv) Isopropyl alcohol | | — | — | — | — | — | 79 | — | 29 | — |
| | Comparative (v) Ethylene glycol dimethyl ether | | — | — | — | — | — | — | 79 | — | 40 |
| | | Total | 100 | 100 | 100 | 100 | 100 | 100 | 100 | 100 | 100 |
| Properties | Storage stability | | ○ | X | ○ | ○ | ○ | X | X | X | ○ |
| | Odor | | ○ | ○ | ○ | Δ | X | Δ | ○ | ○ | ○ |

TABLE 3

| | Finish treatment agent (B) | | Compound example | | | | | | | | | | |
|---|---|---|---|---|---|---|---|---|---|---|---|---|---|
| Component | Composition | | B-1 | B-2 | B-3 | B-4 | B-5 | B-6 | B-7 | B-8 | B-9 | B-10 | B-11 |
| b-1 | (i) Side chain type monoamino-modified polysiloxane KF-865 | | 1.5 | — | 10 | — | 1 | 1.5 | 1.5 | 1.5 | 1.5 | 1.5 | 1.5 |
| | (ii) Side chain type diamino-modified polysiloxane KF-880 | | — | 1.5 | — | 1.5 | — | — | — | — | — | — | — |
| | (iii) Side chain type aminopolyether both ends modified polysiloxane X-22-3939A | | — | — | — | — | 1 | — | — | — | — | — | — |
| b-2 | (i) Terminal type diamino-modified polysiloxane X-22-161B | | 0.5 | 5 | 1 | 0.5 | 1 | 0.5 | 0.5 | 0.5 | 0.5 | 0.5 | 0.5 |
| b-3 | (i) Anion dispersible silicone resin emulsion R2701 | | 10 | 10 | 10 | 15 | 10 | 5 | 10 | 10 | 10 | 15 | 5 |
| | (ii) Nonionic dispersible silicone resin emulsion NR2706 | | 5 | 5 | 5 | — | 5 | — | 5 | 5 | 5 | — | — |
| | (iii) Nonionic dispersible amino modified | | — | — | — | — | — | — | — | — | — | — | 10 |

TABLE 3-continued

| Finish treatment agent (B) | | Compound example | | | | | | | | | | |
|---|---|---|---|---|---|---|---|---|---|---|---|---|
| Component | Composition | B-1 | B-2 | B-3 | B-4 | B-5 | B-6 | B-7 | B-8 | B-9 | B-10 | B-11 |
| | silicone resin emulsion NP2609 | | | | | | | | | | | |
| | Comparative (i) Cationic dispersible silicone resin emulsion Polon MF-52 | — | — | — | — | — | — | — | — | — | — | — |
| b-4 | (i) Isopropyl alcohol | 10 | 10 | 10 | 10 | 10 | 10 | — | 5 | — | 20 | 5 |
| | (ii) Normal-propyl alcohol | — | — | — | — | — | — | 10 | — | — | — | — |
| | (iii) Ethanol | — | — | — | — | — | 5 | — | 5 | 5 | — | 5 |
| | (iv) Ethylene glycol | — | — | — | — | — | — | — | — | 5 | — | — |
| b-5 | Ion-exchanged water | 73 | 69 | 64 | 73 | 72 | 78 | 73 | 73 | 73 | 63 | 73 |
| | Total | 100 | 100 | 100 | 100 | 100 | 100 | 100 | 100 | 100 | 100 | 100 |
| Properties | Dispersibility | ○ | ○ | ○ | ○ | ○ | ○ | ○ | ○ | ○ | ○ | ○ |
| | Storage stability | ○ | ○ | ○ | ○ | ○ | ○ | ○ | ○ | ○ | Δ | ○ |

TABLE 4

| Finish treatment agent (B) | | Compound example | | | | | | | | | |
|---|---|---|---|---|---|---|---|---|---|---|---|
| Component | Composition | B'-1 | B'-2 | B'-3 | B'-4 | B'-5 | B'-6 | B'-7 | B'-8 | B'-9 | B'-10 |
| b-1 | (i) Side chain type monoamino-modified polysiloxane KF-865 | — | 10 | — | — | 1.5 | 1.5 | 1.5 | 1.5 | 1.5 | 1.5 |
| | Comparative (i) Side chain type epoxy modified polysiloxane X-22-343 | — | — | 5 | — | — | — | — | — | — | — |
| | Comparative (ii) Side chain type epoxyether both ends modified polysiloxane X-22-4741 | — | — | — | 5 | — | — | — | — | — | — |
| b-2 | (i) Terminal type diamino-modified polysiloxane X-22-161B | 5 | — | 0.5 | 0.5 | — | — | 1 | 0.5 | 0.5 | 1 |
| | Comparative (i) Terminal type carboxyl modified polysiloxane X-22-162C | — | — | — | — | 1 | — | — | — | — | — |
| | Comparative (ii) Terminal type silanol modified polysiloxane KF-9701 | — | — | — | — | — | 1 | — | — | — | — |
| b-3 | (i) Anion dispersible silicone resin emulsion R2701 | 10 | 10 | 10 | 10 | 10 | 10 | — | 10 | 20 | 10 |
| | (ii) Nonionic dispersible silicone resin emulsion NR2706 | 5 | 5 | 5 | 5 | 5 | 5 | — | 5 | 5 | 5 |
| | (iii) Nonionic dispersible amino modified silicone resin emulsion NP2609 | — | — | — | — | — | — | — | — | — | — |
| | Comparative (i) Cationic dispersible silicone resin emulsion Polon MF-52 | — | — | — | — | — | — | 15 | — | — | — |
| b-4 | (i) Isopropyl alcohol | 10 | 10 | 10 | 10 | 10 | 10 | 10 | — | 10 | 20 |
| | (ii) Normal-propyl alcohol | — | — | — | — | — | — | — | — | — | 10 |
| | (iii) Ethanol | — | — | — | — | — | — | — | — | — | — |
| | (iv) Ethylene glycol | — | — | — | — | — | — | — | — | — | — |
| | Comparative (i) Ethylene glycol dimethyl ether | — | — | — | — | — | — | — | 10 | — | — |
| b-5 | Ion-exchanged water | 70 | 65 | 69.5 | 69.5 | 72.5 | 72.5 | 72.5 | 73 | 63 | 52.5 |
| | Total | 100 | 100 | 100 | 100 | 100 | 100 | 100 | 100 | 100 | 100 |
| Properties | Dispersibility | ○ | ○ | ○ | ○ | ○ | ○ | Δ | ○ | X | ○ |
| | Storage stability | ○ | ○ | ○ | ○ | ○ | ○ | X | X | X | X |

Table 1 shows the results of compound examples (A-1) to (A-10), i.e., the film-forming agent (A) of the present invention, having different types and mixing ratios of the components (a-1), (a-2), and (a-3). All of them showed satisfactory storage stability and odor. Among them, the component (a-3) in the compound example (A-10) was a solvent consisting of a saturated hydrocarbon solvent and an aromatic hydrocarbon solvent each having carbon atoms in the range of the present invention at a predetermined ratio, in which slight odor was detected, but it was within a range that did not impair the advantageous effects of the present invention.

Table 2 shows the results of comparative film-forming agents of a compound example (A'-2) having a mixing ratio of the components (a-1), (a-2), and (a-3) out of the range of the present invention and comparative compound examples (A'-1) and (A'-3) to (A'-9) including comparative components (a-1) and (a-3). The storage stability and the odor in compound examples (A'-1), (A'-3), (A'-4), and (A'-9) were relatively satisfactory, but the storage stability or the odor was poor in other comparative film-forming agents.

Table 3 shows the results of compound examples (B-1) to (B-11), i.e., the finish treatment agent (B) of the present invention, having different types and mixing ratios of the components (b-1), (b-2), (b-3), (b-4), and (b-5). All of them showed satisfactory dispersibility and storage stability. Among them, slight deterioration such as discoloration was observed in the compound example (B-10), but it was within a range that did not impair the advantageous effects of the present invention.

Table 4 shows the results of comparative finish treatment agents of compound examples (B'-1), (B'-2), (B'-9), and (B'-10) having mixing ratios of the components (b-1), (b-2), (b-3), (b-4), and (b-5) out of the range of the present invention and of compound examples (B'-3) to (B'-8) including comparative components (b-1), (b-2), (b-3), and (b-4). The dispersibility and the storage stability in compound examples (B'-1) to (B'-6) were satisfactory, but in other compound examples, either or both of the dispersibility and the storage stability was poor.

Examples 1 to 20 and Comparative Examples 1 to 16

The prepared film-forming agents (A-1) to (A-10) and comparative film-forming agents (A'-1) to (A'-9) and finish treatment agents (B-1) to (B-11) and comparative finish treatment agents (B'-1) to (B'-10) were used in combination as shown in Tables 5 to 8 for evaluating wiping property, water repellency (initial water repellency, durable water repellency, and water repellency after storage), and gloss. The wiping property, water repellency, and gloss were evaluated by the following tests.

<Wiping Property>

Three droplets (about 3 cc) of each of the film-forming agents (A-1) to (A-10) and comparative film-forming agents (A'-1) to (A'-9) shown in Tables 5 to 8 were dropped with a dropper onto a painted surface of a black painting board (material: SPCC-SD, Specification: JIS-G-3141, size: 0.8 mm×70 mm×150 mm, acrylic coating on one surface after electrodeposition, manufactured by Asahi-Betechno). Subsequently, the painted surface was wiped out with a dry clean cloth (a fabric made from polyester/nylon conjugated fibers having an original yarn diameter of 1 to 5 μm, moisture: 5% or less) such that the film-forming agent was formed into a uniform thin film. The prepared black painting board was left to stand under an atmosphere of 23° C. and 65% RH for 20 minutes to give a test piece (I) coated with the film-forming agent.

About one gram of each of the finish treatment agents (B-1) to (B-11) and the comparative finish treatment agents (B'-1) to (B'-10) shown in Tables 5 to 8 was dropwise applied to the substantial center of a fine fiber cloth (a fabric made of polyester/nylon conjugated fibers having a fiber diameter of 300 dT or less) wetted with water. The test piece (I) coated with the film-forming agent prepared above was rubbed with the fine fiber cloth 10 times in reciprocation to give a test piece (II) treated with the finish treatment agent.

The wiping property was evaluated by the smoothness when a tester rubbed the test piece (I) with the fine fiber cloth impregnated with the finish treatment agent ten times in reciprocation as described above. In addition, for comparison, a black painting board not coated with the film-forming agent (A) was similarly evaluated by rubbing the black painting board ten times in reciprocation (Comparative Example 2). The results are indicated by the following symbols:
  ○: No scratchiness was felt at all,
  Δ: Light scratchiness was felt, and
  x: Heavy scratchiness was felt.

<Water Repellency>

Initial water repellency, durable water repellency, and water repellency after storage were evaluated as follows.

<Initial Water Repellency>

The prepared test piece (II) treated with the finish treatment agent was left to stand under an atmosphere of 23° C. and 65% RH for 30 minutes. The initial water repellency was evaluated by the contact angle of the treated surface of the test piece measured with an automatic contact angle measuring apparatus (automatic contact angle meter DM500 (trademark) manufactured by Kyowa Interface Science Co., Ltd., droplet: 0.2 microliters, pure water, measurement: θ/2 method). The results are indicated by the following criteria:

⊙: a contact angle of not less than 100°,
  ○: a contact angle of less than 100° and not less than 95°,
  Δ: a contact angle of less than 95° and not less than 85°, and
  x: a contact angle of less than 85°.

<Durable Water Repellency>

The prepared test piece (II) treated with the finish treatment agent was left to stand under an atmosphere of 23° C. and 65% RH for one day. Subsequently, the test piece was treated with an accelerated weather resistance tester ASTM G154 (Uvcon model UC-1 (trademark) manufactured by ALTAS Corporation, a fluorescent UV lamp, one cycle: irradiation with UV (60° C.×8 hours)+sprinkling water (50° C.×4 hours)) for 1000 hours. The test piece taken out from the tester was evaluated by measuring the contact angle under the same conditions as those in evaluation of the initial water repellency. The results are indicated by the following criteria:

⊙: a contact angle of not less than 100°,
  ○: a contact angle of less than 100° and not less than 95°,
  Δ: a contact angle of less than 95° and not less than 85°, and
  x: a contact angle of less than 85°.

<Water Repellency after Storage>

The film-forming agent (A) and the finish treatment agent (B) evaluated for the storage stability as in above were used. The film-forming agent (A) was applied by the same process as in the evaluation of wiping property, followed by treatment with the finish treatment agent (B) to give a test piece (III). The test piece (III) was evaluated by measuring the contact angle under the same conditions as in the evaluation of the initial water repellency. The results are indicated by the following criteria:

⊙: a contact angle of not less than 100°,
  ○: a contact angle of less than 100° and not less than 95°,
  Δ: a contact angle of less than 95° and not less than 85°, and
  x: a contact angle of less than 85°.

<Gloss>

The prepared test piece (II) treated with the finish treatment agent was left to stand under an atmosphere of 23° C. and 65% RH for 30 minutes. The gloss of the treated surface of the test piece was measured in accordance with the specular glossiness measuring method specified in JIS Z 8741 with a specular glossiness measuring apparatus Gloss Checker IG-331 (trademark) manufactured by Horiba, Ltd. The results are indicated by the following criteria:

⊙: a specular glossiness value of not less than 90°
  ○: a specular glossiness value of less than 90° and not less than 85°
  Δ: a specular glossiness value of less than 85° and not less than 80°
  x: a specular glossiness value of less than 80°

Tables 5 to 8 show the results of these evaluations. In the results, a test piece having three or more [Δ]s and a test piece having one or more [x]s were determined to be poor. In the tables shown below, the test piece in Comparative Example 1 was not treated with any finish treatment agent. In Comparative Example 1, a film-forming agent was applied so as to form a uniform thin film as described above, and after 10 minutes, the surface was lightly rubbed with a dry clean fine fiber cloth. Subsequently, the film was left to stand under an atmosphere of 23° C. and 65% RH for one day. The initial water repellency was evaluated by measuring the contact angle with the same automatic contact angle measuring apparatus as above. In evaluation of the durable water repellency, a test piece treated as in the evaluation of the initial water repellency in Comparative Example 1 was further left to stand under an atmosphere of 23° C. and 65% RH for one day and was then treated with the same accelerated weather resistance tester ASTMG154 as above, and the contact angle was measured with the same automatic contact angle measuring apparatus as above. In evaluation of the water repellency after storage, the film-forming agent (A) used in the evaluation of storage stability was applied so as to form a uniform thin film as in the evaluation of water repellency in Comparative Example 1, and after 10 minutes, the surface was lightly rubbed with a dry clean fine fiber cloth. Subsequently, the film was left to stand under an atmosphere of 23° C. and 65% RH for one day. The water repellency after storage was evaluated by measuring the contact angle with the same automatic contact angle measuring apparatus as above. In evaluation of the gloss, a test piece treated as in the evaluation of the initial water repellency in the above was left to stand under an atmosphere of 23° C. and 65% RH for 30 minutes as in the evaluation of gloss above. Subsequently, the gloss was measured with the same specular glossiness measuring apparatus as in above. The test piece in Comparative Example 2 was not treated with the film-forming agent (A), and the finish treatment agent (B) was directly applied onto a black painting board. The test piece in Comparative Example 15 (*2 in Table 8) was prepared as in the evaluation of wiping-out described above by applying the film-forming agent (A-1) with a dry clean cloth and then further applying the finish treatment agent (B-1) with another dry cloth of the same type. The test piece in Comparative Example 16 (*1 in Table 8) was prepared as in the evaluation of wiping-out described above by applying the film-forming agent (A-1) with a fine fiber cloth wetted with water and then further applying the finish treatment agent (B-1) with another fine fiber cloth of the same type wetted with water.

TABLE 5

|  |  | Example |  |  |  |  |  |  |  |  |  | Comp. Example 1 |
|---|---|---|---|---|---|---|---|---|---|---|---|---|
|  |  | 1 | 2 | 3 | 4 | 5 | 6 | 7 | 8 | 9 | 10 |  |
|  | Type of film-forming agent (A) | A-1 | A-2 | A-3 | A-4 | A-5 | A-6 | A-7 | A-8 | A-9 | A-10 | A-1 |
|  | Type of finish treatment agent (B) | B-1 | B-1 | B-1 | B-1 | B-1 | B-1 | B-1 | B-1 | B-1 | B-1 | — |
| Properties | Initial water repellency | ○ | ◎ | ○ | ◎ | ○ | ◎ | ○ | ○ | ◎ | ○ | ○ |
|  | Durable water repellency | ◎ | ◎ | Δ | ◎ | ○ | Δ | Δ | Δ | ◎ | ◎ | Δ |
|  | Water repellency after storage | ◎ | ◎ | ○ | ◎ | ◎ | ○ | ◎ | Δ | ◎ | ◎ | Δ |
|  | Gloss | ◎ | ◎ | ○ | ◎ | ○ | ◎ | ○ | ◎ | ◎ | ◎ | X |
|  | Wiping property | ○ | ○ | ○ | Δ | ○ | ○ | ○ | ○ | Δ | ○ | — |

TABLE 6

|  |  | Example |  |  |  |  |  |  |  |  |  | Comp. Example 2 |
|---|---|---|---|---|---|---|---|---|---|---|---|---|
|  |  | 11 | 12 | 13 | 14 | 15 | 16 | 17 | 18 | 19 | 20 |  |
|  | Type of film-forming agent (A) | A-1 | A-1 | A-1 | A-1 | A-1 | A-1 | A-1 | A-1 | A-1 | A-1 | — |
|  | Type of finish treatment agent (B) | B-2 | B-3 | B-4 | B-5 | B-6 | B-7 | B-8 | B-9 | B-10 | B-11 | B-1 |
| Properties | Initial water repellency | ◎ | ◎ | ◎ | ◎ | ◎ | ◎ | ◎ | ○ | ◎ | ○ | Δ |
|  | Durable water repellency | ◎ | ◎ | ◎ | ○ | Δ | ○ | ○ | ○ | ◎ | Δ | X |
|  | Water repellency after storage | ○ | ○ | ◎ | ○ | ○ | ○ | ○ | ○ | ○ | ○ | — |
|  | Gloss | ○ | ◎ | ◎ | ○ | ○ | Δ | ○ | Δ | ○ | ◎ | Δ |
|  | Wiping property | ○ | Δ | ○ | ○ | ○ | Δ | Δ | Δ | ○ | ○ | X |

TABLE 7

|  |  | Comparative Example |  |  |  |  |  |
|---|---|---|---|---|---|---|---|
|  |  | 1 | 2 | 3 | 4 | 5 | 6 |
|  | Type of film-forming agent (A) | A-1 | — | A'-1 | A'-3 | A'-4 | A'-9 |
|  | Type of finish treatment agent (B) | — | B-1 | B-1 | B-1 | B-1 | B-1 |
| Properties | Initial water repellency | ○ | Δ | ○ | ○ | ○ | ○ |
|  | Durable water repellency | Δ | X | X | Δ | ○ | Δ |
|  | Water repellency after storage | Δ | — | X | ○ | ○ | X |
|  | Gloss | X | Δ | Δ | Δ | Δ | Δ |
|  | Wiping property | — | X | ○ | X | X | Δ |

TABLE 8

|  |  | Comparative Example |  |  |  |  |  |  |  |  |  |
|---|---|---|---|---|---|---|---|---|---|---|---|
|  |  | 7 | 8 | 8 | 10 | 11 | 12 | 13 | 14 | 15 | 16 |
|  | Type of film-forming agent (A) | A-1 | A-1 | A-1 | A-1 | A-1 | A-1 | A'-1 | B-1 | A-1 | A-1*1 |
|  | Type of finish treatment agent (B) | B'-1 | B'-2 | B'-3 | B'-4 | B'-5 | B'-6 | B'-1 | A-1 | B-1*2 | B-1 |
| Properties | Initial water repellency | Δ | ○ | ○ | ○ | Δ | Δ | X | Δ | ○ | Δ |
|  | Durable water repellency | X | Δ | X | X | X | X | X | X | Δ | X |
|  | Water repellency after storage | Δ | Δ | Δ | X | X | X | X | X | Δ | X |
|  | Gloss | X | X | Δ | Δ | Δ | Δ | X | Δ | X | Δ |
|  | Wiping property | ○ | ○ | Δ | Δ | Δ | Δ | X | X | X | Δ |

*1 a test piece coated with the film-forming agent (A-1) with a fine fiber cloth wetted with water
*2 a test piece coated with the finish treatment agent (B-1) with a dry cloth In Examples 1 to 10 shown in Table 5, the compound examples (A-1) to (A-10) shown in Table 5 were used as the film-forming agent (A), and the compound example (B-1) shown in Table 3 was used as the finish treatment agent (B). The resulting coating layers all had satisfactory properties. In Comparative Example 1, the finish treatment agent (B) was not used. It was revealed that the use of the film-forming agent (A) only cannot provide a coating layer having satisfactory properties and that a coating layer having significantly good properties can be provided by using the finish treatment agent (B) of the present invention too. In Examples 11 to 20 shown in Table 6, the compound example (A-1) show in Table 1 was used as the film-forming agent (A), and the compound examples (B-2) to (B-11) shown in Table 3 were used as the finish treatment agent (B). The resulting coating layers all had satisfactory properties. In Comparative Example 2, the film-forming agent (A) was not used. It was revealed that the use of the finish treatment agent (B) only without using the film-forming agent (A) cannot provide a coating layer having satisfactory properties.

In Comparative Examples 3 to 6 shown in Table 7, the finish treatment agent (B-1) of the present invention was used in combination with the comparative film-forming agent (A'-1), (A'-3), (A'-4), or (A'-9). The comparative film-forming agents (A'-1), (A'-3), (A'-4), and (A'-9) each had relatively satisfactory storage stability and odor, but the properties of the resulting coating layers were not satisfactory. In Comparative Examples 7 to 12 shown in Table 8, the film-forming agent (A-1) of the present invention was used in combination with any of the comparative finish treatment agents (B'-1) to (B'-6). The finish treatment agents (B'-1) to (B'-6) each had satisfactory dispersibility and storage stability, but the properties of the resulting coating layers were not satisfactory. In Comparative Example 13, a combination of the comparative film-forming agent (A'-1) and the comparative finish treatment agent (B'-1) was employed. The agent (A'-1) had satisfactory storage stability and odor, and the agent (B'-1) also had satisfactory dispersibility and storage stability. The coating layer made from these agents, however, showed significantly poor properties. In Comparative Example 14, the film-forming agent (A-1) and the finish treatment agent (B-1) of the present invention were used, but the agent (B-1) was first applied onto a base material, and then the agent (A-1) was applied there onto. The resulting coating layer showed significantly poor properties. In both Comparative Examples 15 and 16, the film-forming agent (A-1) and the finish treatment agent (B-1) of the present invention were used. In Comparative Example 15, the finish treatment agent (B-1) was applied with a dry cloth. In Comparative Example 16, the film-forming agent (A-1) was applied with a fine fiber cloth wetted with water. Both the resulting coating layers showed significantly poor properties.

INDUSTRIAL APPLICABILITY

The coating layer of the present invention can impart excellent water repellency and satisfactory gloss to a base material, for example, the exterior of a vehicle. In the method for forming a coating layer of the present invention, the agent used has excellent storage stability and excellent workability during application, and the resulting coating layer can impart excellent water repellency and satisfactory gloss to a base material, for example, the exterior of a vehicle. Accordingly, the coating layer and the method for forming the coating layer of the present invention are expected to be greatly used in the future in coating of, for example, the exteriors of automobiles.

The invention claimed is:

1. A coating layer comprising:
   a layer (I) prepared by curing 100 parts by mass in total of a film-forming agent (A) containing:
      3 to 45 parts by mass of a polyorganosiloxane (a-1) having at least one hydrolyzable functional group in its molecule;
      0.05 to 5 parts by mass of a curing catalyst (a-2); and
      50 to 96.95 parts by mass of an organic solvent (a-3) comprising a saturated hydrocarbon solvent having 8 to 15 carbon atoms and an aromatic hydrocarbon solvent having 8 to 15 carbon atoms at a mass ratio of the saturated hydrocarbon solvent to the aromatic hydrocarbon solvent of 100/0 to 50/50, and
   a layer (II) prepared by solidifying 100 parts by mass in total of a finish treatment agent (B) containing:
      0.05 to 15 parts by mass of a polyorganosiloxane (b-1) having at least one pendant amino group;
      0.01 to 10 parts by mass of a polyorganosiloxane (b-2) having two or more terminal amino groups;
      1 to 20 parts by mass, in terms of the solid content, of a silicone resin emulsion (b-3) emulsified with a nonionic or anionic surfactant;
      0.1 to 25 parts by mass of a hydrophilic group-containing organic solvent (b-4); and
      30 to 98.84 parts by mass of water (b-5), wherein the layer (I) is disposed on a base material side, and the layer (II) is disposed on a surface side.

2. The coating layer according to claim 1, wherein the layer (I) is disposed on the base material, and the layer (II) is disposed on the layer (I).

3. The coating layer according to claim 1, wherein the layer (I) has a thickness of 0.1 to 0.5 µm, and the layer (II) has a thickness of 0.1 to 0.5 µm.

4. The coating layer according to claim 1, wherein the saturated hydrocarbon solvent having 8 to 15 carbon atoms in the component (a-3) is an isoparaffin solvent.

5. The coating layer according to claim 1, wherein the component (b-4) is an alcohol.

6. The coating layer according to claim 1, wherein the component (a-1) is a polydimethylsiloxane having hydrolyzable functional groups at both ends of the molecular chain.

7. The coating layer according to claim 1, wherein the base material is the exterior of a vehicle.

8. A method for forming a coating layer, the method comprising:
   (a) forming a layer (I) by applying 100 parts by mass in total of a film-forming agent (A) containing:
      3 to 45 parts by mass of a polyorganosiloxane (a-1) having at least one hydrolyzable functional group in its molecule;
      0.05 to 5 parts by mass of a curing catalyst (a-2); and
      50 to 96.95 parts by mass of an organic solvent (a-3) comprising a saturated hydrocarbon solvent having 8 to 15 carbon atoms and an aromatic hydrocarbon solvent having 8 to 15 carbon atoms at a mass ratio of the saturated hydrocarbon solvent to the aromatic hydrocarbon solvent of 100/0 to 50/50,
   onto a base material and drying the film-forming agent (A) at environmental temperature for 5 to 90 minutes; and
   (b) forming a layer (II) by applying 100 parts by mass in total of a finish treatment agent (B) containing:
      0.05 to 15 parts by mass of a polyorganosiloxane (b-1) having at least one pendant amino group;
      0.01 to 10 parts by mass of a polyorganosiloxane (b-2) having two or more terminal amino groups;

1 to 20 parts by mass, in terms of the solid content, of a silicone resin emulsion (b-3) emulsified with a nonionic or anionic surfactant;

0.1 to 25 parts by mass of a hydrophilic group-containing organic solvent (b-4); and 30 to 98.84 parts by mass of water (b-5), onto the layer (I) and drying the finish treatment agent (B) at environmental temperature for 10 minutes or more.

9. The method for forming a coating layer according to claim 8, wherein the film-forming agent (A) in step (a) is applied with a dry cloth, and the finish treatment agent (B) in step (b) is applied with a wet cloth.

10. The method for forming a coating layer according to claim 8, wherein the amount of the film-forming agent (A) in step (a) is 0.1 to 10 mL/m$^2$ of the base material, and the amount of the finish treatment agent (B) in step (b) is 0.1 to 10 mL/m$^2$ of the base material.

11. The method for forming a coating layer according to claim 8, wherein the saturated hydrocarbon solvent having 8 to 15 carbon atoms in the component (a-3) is an isoparaffin solvent.

12. The method for forming a coating layer according to claim 8, wherein the component (b-4) is an alcohol.

13. The method for forming a coating layer according to claim 8, wherein the component (a-1) is a polydimethylsiloxane having hydrolyzable functional groups at both ends of the molecular chain.

14. The method for forming a coating layer according to claim 8, wherein the base material is the exterior of a vehicle.

* * * * *